United States Patent Office 3,378,377
Patented Apr. 16, 1968

3,378,377
YEAST-STARCH DIETETIC TABLETS AND THEIR PRODUCTION
Henri Griffon, 2 Place Mazas, and Georges Tixier, 37 Ave. d'Iena, both of Paris, France
No Drawing. Continuation of application Ser. No. 314,554, Oct. 7, 1963, which is a continuation-in-part of application Ser. No. 136,190, Sept. 6, 1961. This application Aug. 23, 1966, Ser. No. 577,569
Claims priority, application France, Sept. 6, 1960, 837,875; May 12, 1961, 861,551
3 Claims. (Cl. 99—96)

ABSTRACT OF THE DISCLOSURE

Dehydration and compression of fresh yeast cells containing about 70% water, in the presence of starch, kills the yeast cells, but keeps them essentially intact as to morphological structure, color and organoleptic properties. The product has about 11% moisture content and is capable of dispersion in water.

---

This application is a continuation of Ser. No. 314,554, filed Oct. 7, 1963, which was a continuation-in-part of Ser. No. 136,190, filed Sept. 6, 1961 and both applications have now been abandoned.

This invention relates to yeast-starch tablets useful for dietetic and therapeutic purposes and to procedure for producing such tablets, wherein the yeast cells are substantially killed during their processing.

It is known that the yeast cells of ordinary fresh or untreated yeast are extremely sensitive to temperature, humidity and pressure conditions. In some instances as in the aforesaid co-pending application it is desired to maximize the number of living yeast cells. However, under other circumstances as in connection with the present invention it has been found best to kill as many yeast cells as possible. Thus in accordance with the present invention the yeast cells are deliberately subjected to conditions which kill most if not all of the yeast cells without, however, destroying their morphological and organoleptic properties.

We have discovered that dietetic yeast-starch tablets can be readily prepared by thoroughly admixing fresh untreated yeast of about 70% moisture content and powdered starch, dehydrating the mixture until the moisture is approximately 11% in order to place the mixture in equilibrium with the atmosphere (which corresponds to 9% to 13%) so that there is little or not tendency of the mixture to pick up moisture from the atmosphere or lose moisture to the atmosphere. The dehydration can be carried out in any suitable manner such as by forming the mixture into a relatively thin layer on drying plates or equipment and/or subjecting the mixture to a mild current of warm air. After the moisture content is reduced to approximately 11% the dehydrated mixture is then granulated in any suitable or known manner, and the granules are finally subjected to sufficient compression on a standard tableting machine in order to form the tablets while at the same time killing at least a predominant proportion of the yeast cell by using relatively high tableting pressures all or substantially all yeast cells can be killed. The effect of tableting pressure on the number of living yeast cells is well illustrated by the fact that when the compression of tableting amounts to 1600 kilograms per square centimeter for a tablet of 6.3 millimeters the number of living yeast cells per gram is 1.8 billion. When the compression is increased to 2600 kilograms per square centimeter the number of living yeast cells per gram is 260 million and pressures above 2600 kilograms per square centimeter and for example, up to 4,000 kilograms per square centimeter kill 100% of the yeast cells.

The present invention is predicated on the discovery that yeast cells can be killed by a purely mechanical phenomenon, namely compression, so that while the yeast cells lose their vitality they retain their other properties, notably as to color, odor and taste, thus in contrast with other methods which involve relatively drastic heating and dehydrating conditions thereby modifying adversely the organoleptic properties and producing products which are brown in color and have the taste of peptone. The present invention is further predicated on the discovery that by subjecting the dehydrated yeast-starch granulation to sudden or violent instantaneous mechanical shock which is correlated with thermoshock, then ideal tablets result for present purposes. In carrying out the necessary compression with modern tableting machines, the tableting occurs in a period of time of the order of $2/10$ of a second. These machines give for example, 300 compressions to the minute of tablets having an average weight of 0.44 gram. In order to carry this out the machine acts on successive quantities of material corresponding to the volumetric capacity of the admission chamber formed by the matrix and the punch therebeneath (a distance of 22 millimeters), and for a cylinder diameter of 11 millimeters. The proportion of living cells diminishes as a function of the compression and beyond the conditions above set forth living yeast cells no longer exist. The tablets which result are characterized by retaining their morphological and organoleptic properties and have a desirable taste similar to fresh yeast. This is in contrast with the fact that the ordinary processing of yeast without tableting leaves about 30 to 40% of living yeast cells.

In carrying out the invention and by way of non-limitative example a quantity of fresh un-treated yeast having a moisture content of approximately 70% is thoroughly admixed with dry powdered starch in such proportions that the starch constitutes between 75% and 25% of the mixture prior to dehydration. It is understood that if desired this mixture may be reduced as to its moisture contents, but such is not essential. The yeast-starch mixture is then dehydrated in any suitable or known manner as by spreading it out in a thin layer on drying plates or equipment, and/or a mild current of warm dry air is passed over the mixture. Dehydration is continued until the moisture content of the mixture is approximately 11%. It has been found that this is very beneficial in that this moisture content contributes to the formation of a stable product which is not susceptible to deterioration or moisture content change because the moisture content is in equilibrium with the atmosphere, and consequently there is practically no tendency for the mixture to pick up moisture from the atmosphere or to lose moisture to the atmosphere. Prior to dehydration the relative proportions of fresh untreated yeast and starch are preferably in the ratio of 100 grams of yeast to 60 grams of starch but variations from this ratio are permissible within the percentage ranges set forth above. The dehydrated mixture having a moisture content of approximately 11% is subjected to dry granulation in a manner well known in the pharmaceutical industry, and is then tableted on a standard tableting machine adjusted to produce tablets of the requisite size and thickness.

The effect of compression on the number of living cells is shown by the following table:

| Compression in kg. per square centimeter | Thickness of the Compressed Tablets in millimeters | Number of Cells per gram (in millions) | | | |
|---|---|---|---|---|---|
| | | Total Number of Cells | Number of Living Cells | Number of Dead Cells | Percentage of Living Cells |
| 0 | | 10,000 | 4,400 | 5,250 | 44.0 |
| 800 | 7.4 | 10,000 | 4,000 | 6,000 | 44.0 |
| 1,000 | 7.1 | 10,000 | 4,000 | 6,000 | 44.0 |
| 1,200 | 6.9 | 10,000 | 3,500 | 6,250 | 35.0 |
| 1,400 | 6.6 | 9,000 | 2,500 | 6,350 | 28.0 |
| 1,600 | 6.3 | 8,800 | 1,800 | 7,000 | 20.5 |
| 1,800 | 5.9 | 8,350 | 700 | 7,650 | 8.4 |
| 2,100 | 5.7 | 8,180 | 360 | 7,820 | 4.4 |
| 2,600 | 5.4 | 8,000 | 260 | 7,740 | 3.25 |
| 2,800 | 5.2 | 8,000 | 0 | 8,000 | 0 |
| 3,300 | 5.2 | 7,250 | 0 | 7,250 | 0 |
| 4,000 | 5.2 | 7,250 | 0 | 7,250 | 0 |

The above table well illustrates how the number of living cells per gram of yeast can be reduced to zero or any other desired value and for purposes of the present invention it is preferred to kill all the yeast cells so that in the compressed tablets there are no living yeast cells.

The starch employed may be of any suitable nature such as corn starch, rice starch, potato starch, or cereal starch. The yeast which is used is preferably the ordinary fresh un-treated commercial yeast having an initial moisture content of approximately 70%.

What is claimed is:

1. A method of producing a dietetic yeast-starch composition in tablet form which comprises thoroughly admixing 75 to 25% of fresh untreated yeast of about 70% moisture content and 25 to 75% of powdered corn, rice, potato or cereal starch, dehydrating the mixture until the moisture content is approximately 11%, granulating the dehydrated mixture and tableting the granulation under sufficient compression to kill at least a predominant proportion of the yeast cells the temperature being maintained throughout between ambient and 37° C.

2. A method according to claim 1 in which the amount of compression is sufficient to kill all yeast cells.

3. A dietectic yeast-starch composition in tablet form of approximately 11% moisture content obtained by thoroughly admixing 75 to 25% of fresh untreated yeast of about 70% moisture content and 25 to 75% of powdered corn, rice, potato or cereal starch, dehydrating the mixture until the moisture content is approximately 11%, granulating the dehydrated mixture and tableting the granulation under sufficient compression to kill at least a predominant proportion of the yeast cells while retaining the morphological form, color, odor and organoleptic properties of living yeast cells and while maintaining the temperature between ambient and 37° C.

References Cited
UNITED STATES PATENTS

| | | | |
|---|---|---|---|
| 1,306,569 | 6/1919 | Whitney | 99—96 |
| 1,420,557 | 6/1922 | Klein | 99—96 |
| 2,921,854 | 1/1960 | Parker | 99—96 |

A. LOUIS MONACELL, *Primary Examiner.*

D. M. NAFF, *Assistant Examiner.*